No. 811,961. PATENTED FEB. 6, 1906.
E. V. SEXMITH & D. E. MOULTON.
AUTOMATIC CAR COUPLING.
APPLICATION FILED APR. 13, 1905.
2 SHEETS—SHEET 1.
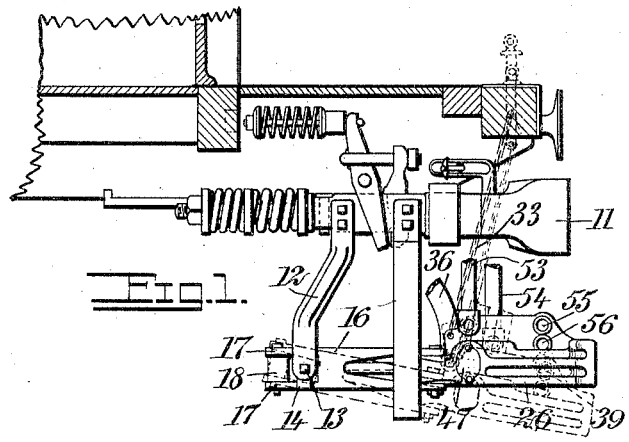
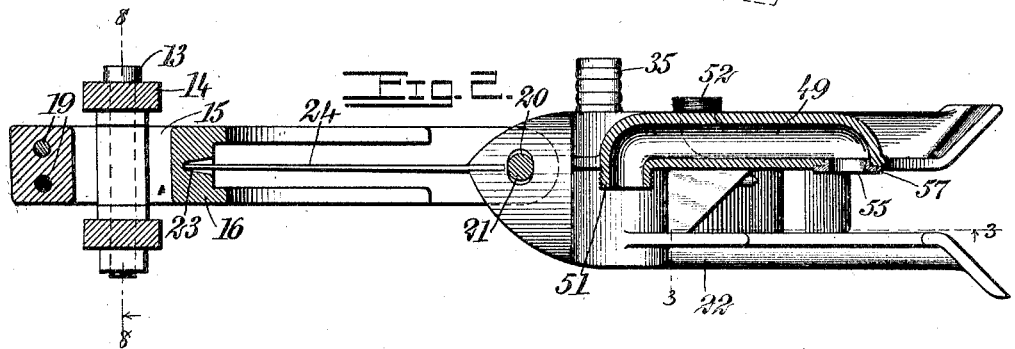
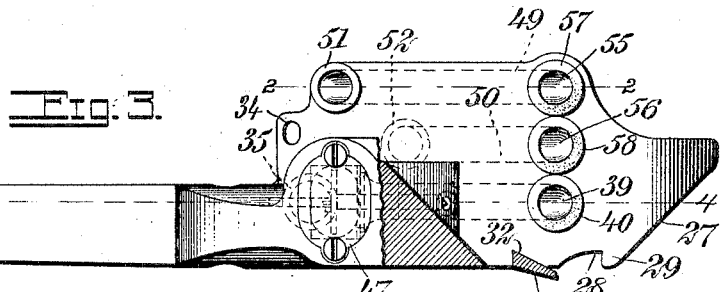
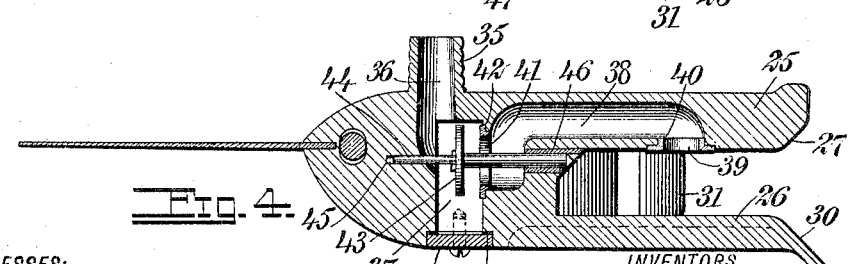
WITNESSES:
L. Almquist
A. E. Fay
INVENTORS
Emerson V. Sexmith
Dexter E. Moulton
BY
ATTORNEYS No. 811,961. PATENTED FEB. 6, 1906.
E. V. SEXMITH & D. E. MOULTON.
AUTOMATIC CAR COUPLING.
APPLICATION FILED APR. 13, 1905.
2 SHEETS—SHEET 2
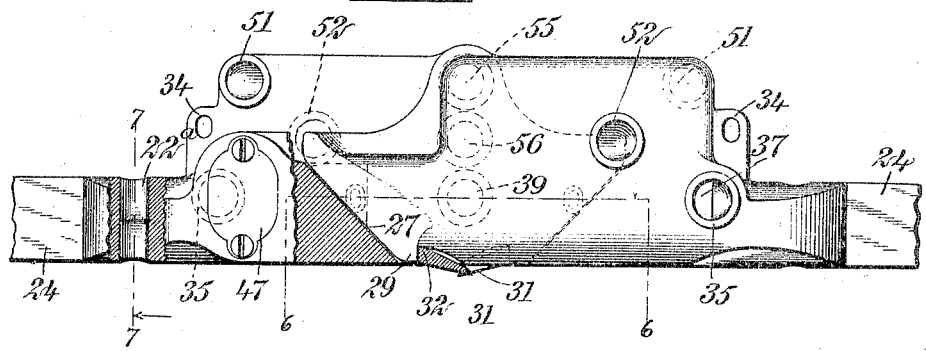
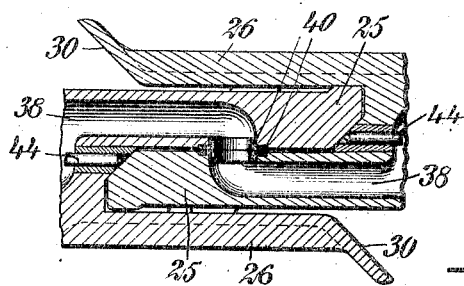
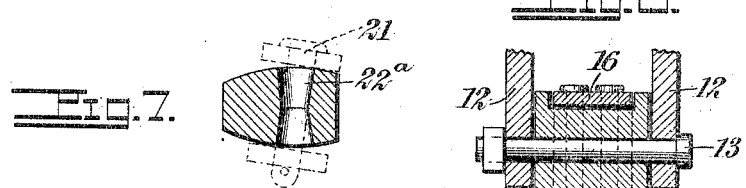
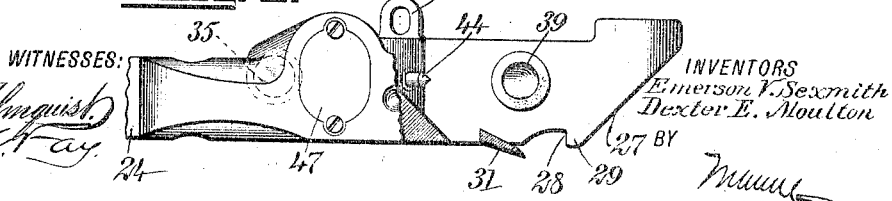
WITNESSES:
INVENTORS
Emerson V. Sexmith
Dexter E. Moulton
BY
ATTORNEYS

UNITED STATES PATENT OFFICE.

EMERSON VALLEAU SEXMITH, OF FOND DU LAC, WISCONSIN, AND DEXTER EDWARD MOULTON, OF BELLE PLAINE, IOWA.

AUTOMATIC AIR-COUPLING.

No. 811,961.     Specification of Letters Patent.     Patented Feb. 6, 1906.

Application filed April 13, 1905. Serial No. 255,362.

*To all whom it may concern:*

Be it known that we, EMERSON VALLEAU SEXMITH, a resident of Fond du Lac, in the county of Fond du Lac and State of Wisconsin, and DEXTER EDWARD MOULTON, a resident of Belle Plaine, in the county of Benton and State of Iowa, citizens of the United States, have invented a new and Improved Automatic Air-Coupler, of which the following is a full, clear, and exact description.

Our invention relates to an automatic air-coupler for use upon either passenger or freight trains; and the principal objects thereof are to add to the efficiency without increasing the cost of these devices and to provide a construction which will operate effectively to conduct air from one car to another, as well as to provide for the automatic coupling of the parts and to secure means for allowing adjustment to suit various kinds of cars.

Reference is to be had to the accompanying drawings, forming a part of this specification, in which similar characters of reference indicate corresponding parts in all the figures.

Figure 1 is a vertical sectional view of a portion of the end of a car, showing one manner of mounting thereon a coupler embodying the principle of our invention. Fig. 2 is a sectional view on the line 2 2 of Fig. 3, showing the coupling member of our improved coupler and also showing in section a supporting member therefor. Fig. 3 is a sectional view on the line 3 3 of Fig. 2. Fig. 4 is a sectional view on the line 4 4 of Fig 3. Fig. 5 is an elevation, partly in section, showing the coupling elements of two cars in engagement with each other. Fig. 6 is a sectional view on the line 6 6 of Fig. 5. Fig. 7 is a sectional view on the line 7 7 of Fig. 5. Fig. 8 is a sectional view on the line 8 8 of Fig. 2; and Fig. 9 is a view similar to Fig. 3, showing a modified form of our invention suitable for freight-cars.

Fig. 1 shows a car provided with the usual coupler 11 and its attachments. A hanger 12 is connected with the draw-bar, and by means of a bolt 13 it supports a block 14, which is slidably mounted in a slot 15 of a supporting member 16 of the coupler. This supporting member comprises a main body, as shown, having two rearwardly-extending projections 17, between the ends of which is contained an end block 18, held by bolts or pins 19. This supporting member projects toward the end of the car and is provided with a pair of perforations 20 at its ends for receiving a pin 21, by means of which it is pivotally connected with a coupling member 22. The pin passes through a perforation 22ª in the coupling member, which, as shown in Fig. 7, is flared outwardly in both directions from the center to provide for a rocking motion of the coupling member. The supporting member is also provided with a depression 23 for receiving the end of a spring 42, which is rigidly attached at the other end to the inner part of the coupling member. The coupling member can swing slightly upon the pin 21 to accommodate curves, and the spring 24 will yield to allow for this movement, but will return the parts into alinement after the curve is passed. The bolt 13 also allows for giving play to the coupler to correspond to that of the knuckle of the coupler 11. It also provides for a free rise and fall, allowing the device to couple and uncouple and to conform to the heights of loaded and empty cars and also to cars of different makes. The coupling member is provided with two projections 25 and 26, the former having an inclined lower surface 27 and a notch 28, forming a projection 29. The projection 26 has a slanting surface 30. Between the two projections is a guide-plate 31. This guide-plate has a slanting upper surface and its rear corner 32 at the top corresponds inversely to the notch 28. As both the coupling members are formed in the same manner the two will fit together, as shown in Figs. 5 and 6, when the projection 25 of each is passed into the space between the two projections 25 and 26 of the other. The projection 32 of each coupling then enters the notch 28 of the other coupling member, and this locks the parts in position until both of the members are raised to release the parts from this position. This is preferably accomplished by the operation of a chain 33, which is connected with an eye 34 in the top of each coupling member and is in turn connected with any desirable operating arm or lever within convenient reach of the operator. The purpose of providing the slanting surfaces 27 and 30 will be readily seen. They serve as guides to cause the parts to enter the positions as described above. Each coupling member is provided with a nozzle or pipe 35 for connecting with a hose 36 of the pipe-line through the car for the air-brakes. This hose preferably connects with a T placed on the rear of the present angle-cock and hose connection, which are left as they now are to provide for coupling with cars not equipped with this automatic coupler. Fig. 1 shows in dotted lines the coupler in inclined position as it remains when dropped out of locking position. Leading from the nozzle or pipe 35 is a passage 36, which enters a chamber 37 in the body of the coupler. This chamber communicates through a passage 38 with an outlet 39. This outlet is preferably provided with a rubber or other gasket 40. It will be seen by reference to Fig. 6 that the two outlets of the right and left members of the coupling register with each other when the parts are in interlocking position. Between the chamber 37 and the passage 38 is an opening 41, having a gasket 42 and controlled by a valve 43. This valve is mounted upon a stem 44, which is guided in a recess 45 and a brass bushing 46. Normally the air-pressure in the passage 36 forces the valve 43 to its seat and closes the passage 41; but when the parts are in interlocking position the slanting surface 27 comes into contact with the end of the valve-stem and forces the valve from its seat. This operation is shown in Fig. 6, and the position of the valve when the parts are locked is shown in Fig. 4. A plate 47 is preferably located over the chamber 37 and secured in position in any desired manner, with a packing 48 between it and the walls of the coupling member, so as to provide for an inspection of the valve and other parts within the chamber.

The parts so far described are equally applicable to freight and passenger cars, and as far as the use of the device for freight-cars is concerned it needs no more attachments. The form shown in Fig. 9 is provided with the same reference-numerals as those used for describing the other figures, because the parts are substantially the same and serve in all cases the same purposes so far as described above. Where the device is intended to be used for passenger-cars, however, additional features are preferably employed for the purpose of automatically controlling the steam-heating and air-signal systems used on passenger-cars. These additional features consist merely in passages 49 and 50 for these two systems, respectively. These passages are provided with nozzles or pipes 51 and 52, respectively, for connection with steam-hose 53 and the air-signal hose 54. They are also provided with outlets 55 and 56, having gaskets 57 and 58, respectively. These sets of outlets and gaskets register with those upon the other member of the coupler on the next car.

The manner of operation of the device will be clearly understood from the foregoing description and need not be repeated.

It is to be understood that the invention is capable of use on either passenger or freight cars, and, moreover, that it is capable of embodiment in many other forms than that illustrated, the latter being chosen merely to show the principle of our invention.

Having thus described our invention, we claim as new and desire to secure by Letters Patent—

1. An air-coupler having a horizontally-slidable block for connecting it with the draw-bar of a car, said block being adapted to yield to conform to the horizontal play of the draw-bar.

2. An air-coupler having a sliding block, said block being provided with a transverse pin for pivotally connecting it with the draw-bar of a car.

3. An air-coupler comprising a supporting member having a slidable block for connecting it with a draw-bar, and a coupling member movably connected with the supporting member.

4. An air-coupler comprising a supporting member having a slidable block for connecting it with a draw-bar, a coupling member movably connected with the supporting member, and resilient means for normally holding said members in alinement.

5. A coupler, comprising two members, one member having a depression and the other member having a longitudinal spring entering said depression to yieldingly retain the members in alinement.

6. An air-coupler comprising a supporting member, and a coupling member having a spring projecting toward the supporting member, the supporting member having means for engaging the spring, said spring normally acting to keep said members in alinement.

7. An air-coupler comprising a supporting member, and a coupling member having a longitudinal bar-spring projecting toward the supporting member, the supporting member having means for engaging the spring; said coupling member having an air-brake passage therein, a valve in the passage, and a stem for the valve adapted to be operated by a companion coupler.

8. An air-coupler comprising a coupling member having an air-brake passage, a valve movable longitudinally of the coupler and adapted to close the passage, a longitudinal stem projecting beyond the surface of said member, and a rearwardly-inclined surface adapted to engage a similar projecting stem of a companion coupler.

9. An air-coupler comprising a coupling member having a projection provided with a slanting lower surface and with a notch, and a plate adjacent to said projection corresponding in shape with the notch but extending in the opposite direction.

10. An air-coupler comprising a coupling member having a pair of projections, one of said projections being provided with a slanting lower surface and adapted to enter a space between similar projections upon the companion coupling member, a notch on one of said projections, and a plate corresponding in shape with the notch but extending in the opposite direction.

11. An automatic air-coupler comprising a coupling member having a pair of projections, one of said projections being provided with a slanting lower surface and adapted to enter a space between similar projections upon a companion coupling member, the projection having a slanting surface, being provided with a notch, and the coupling member being provided with a plate between the two projections, said plate corresponding in shape with the notch but extending in the opposite direction.

12. An automatic air-coupler comprising a coupling member having means for locking it to a companion member of the same shape, said coupling member being provided with a passage for the air of an air-brake system, a passage for connection with an air-signal system, and a steam-passage, each of said passages having an outlet and said outlets being located adjacent to each other upon the inner surface of the coupling member.

In testimony whereof we have signed our names to this specification in the presence of two subscribing witnesses.

EMERSON VALLEAU SEXMITH.
DEXTER EDWARD MOULTON.

Witnesses as to the signature of Emerson V. Sexmith:
JOHN H. GORES,
H. F. JOHNSON.

Witnesses as to the signature of Dexter E. Moulton:
E. P. EDWARDS,
H. H. GOLTMAN.